April 22, 1941.　　　　E. W. MOORE　　　　2,239,336
LIGHT SIGNAL FOR RAILROADS
Filed Dec. 22, 1937　　　3 Sheets-Sheet 1

INVENTOR
BY E. W. Moore,
Neil W. Preston,
his ATTORNEY

April 22, 1941.　　　　E. W. MOORE　　　　2,239,336
LIGHT SIGNAL FOR RAILROADS
Filed Dec. 22, 1937　　　3 Sheets-Sheet 2

INVENTOR
E. W. Moore,
BY Neil W. Preston,
his ATTORNEY

April 22, 1941.　　　　E. W. MOORE　　　　2,239,336
LIGHT SIGNAL FOR RAILROADS
Filed Dec. 22, 1937　　　3 Sheets-Sheet 3

INVENTOR
E. W. Moore,
BY Neil W. Preston,
his ATTORNEY

Patented Apr. 22, 1941

2,239,336

UNITED STATES PATENT OFFICE 2,239,336

LIGHT SIGNAL FOR RAILROADS

Edmund W. Moore, Rochester, N. Y., assignor to General Railway Signal Company, Rochester, N. Y.

Application December 22, 1937, Serial No. 181,198

6 Claims. (Cl. 177—329)

This invention relates in general to light signals for use on railroads, and has more particular reference to an improved construction in a so-called "Type-SA," or search light, signal which greatly facilitates and expedites the assembly, maintenance, and repair of the signal.

As set forth above, the signal is of the search light type, such, for example, as shown in general in Patent No. 2,097,785, granted November 2, 1937, to O. S. Field, and entitled "Light signal for railroads," and in the Field application, Ser. No. 561,802, filed September 8, 1931, now Patent No. 2,103,251, granted December 28, 1937.

The signal in question includes an outer casing mountable on a signal pole, and an inner casing which can be inserted into the outer casing and removed therefrom, with the inner casing containing a light source, a spectacle bearing various color screens, and a motor mechanism for operating the spectacle, whereby to permit various colored lights to pass out of the mechanism casing and through a lens in the outer casing, to constitute the signal indication.

Means are provided for accurately positioning the mechanism casing within the outer casing in an invariable manner, whereby, for facilitating repairs in the field, a defective mechanism casing can be removed bodily and a replacement mechanism casing can be substituted therefor.

With a view to facilitating and expediting such removal of a defective mechanism casing and the replacement thereby with an operative mechanism casing, it is proposed, in accordance with this invention, to provide the mechanism casing with a plug coupler; to provide the outer casing with a supporting slide for aiding the insertion and removal of the mechanism casing, in and from, the outer casing; and to provide means for maintaining the wires entering the outer casing in a position where they will not be worn or damaged by removal and replacement of the mechanism casing.

More specifically, it is proposed to employ a plug coupler for making all the connections between external wires and the mechanism casing, whereby the replacement of a mechanism casing requires merely the withdrawal of a plug coupler from the defective casing and the insertion of the plug coupler into the replacement casing. In this manner, there is obviated the necessity for disconnecting wires, tagging the same, and then later reconnecting the wires to the replacement unit.

With regard to the supporting slide for inserting the mechanism casing into the outer casing, this slide supports the weight of the mechanism casing until it is in final position at which time supporting pins cam the casing up and out of contact with the slide. Since the mechanism casing is rather heavy, and is rather difficult to manage during the replacement of the same, the slide greatly facilitates and simplifies the operation. Due to certain clearances existing between latching means on the mechanism casing and cooperating lugs on the outer casing, which have been established in many hundred signals now in use, the slide is so designed as to permit the insertion of the mechanism casing into the outer casing with sufficient clearances to avoid any obstacles to the ready insertion and removal of the mechanism casing, all as will appear more clearly below.

Further objects, purposes and characteristic features of the present invention will appear as the description progresses, reference being made to the accompanying drawings, showing, in a wholly diagrammatic manner, and in no way in a limiting sense, one form which the invention can assume. In the drawings—

Figure 1:
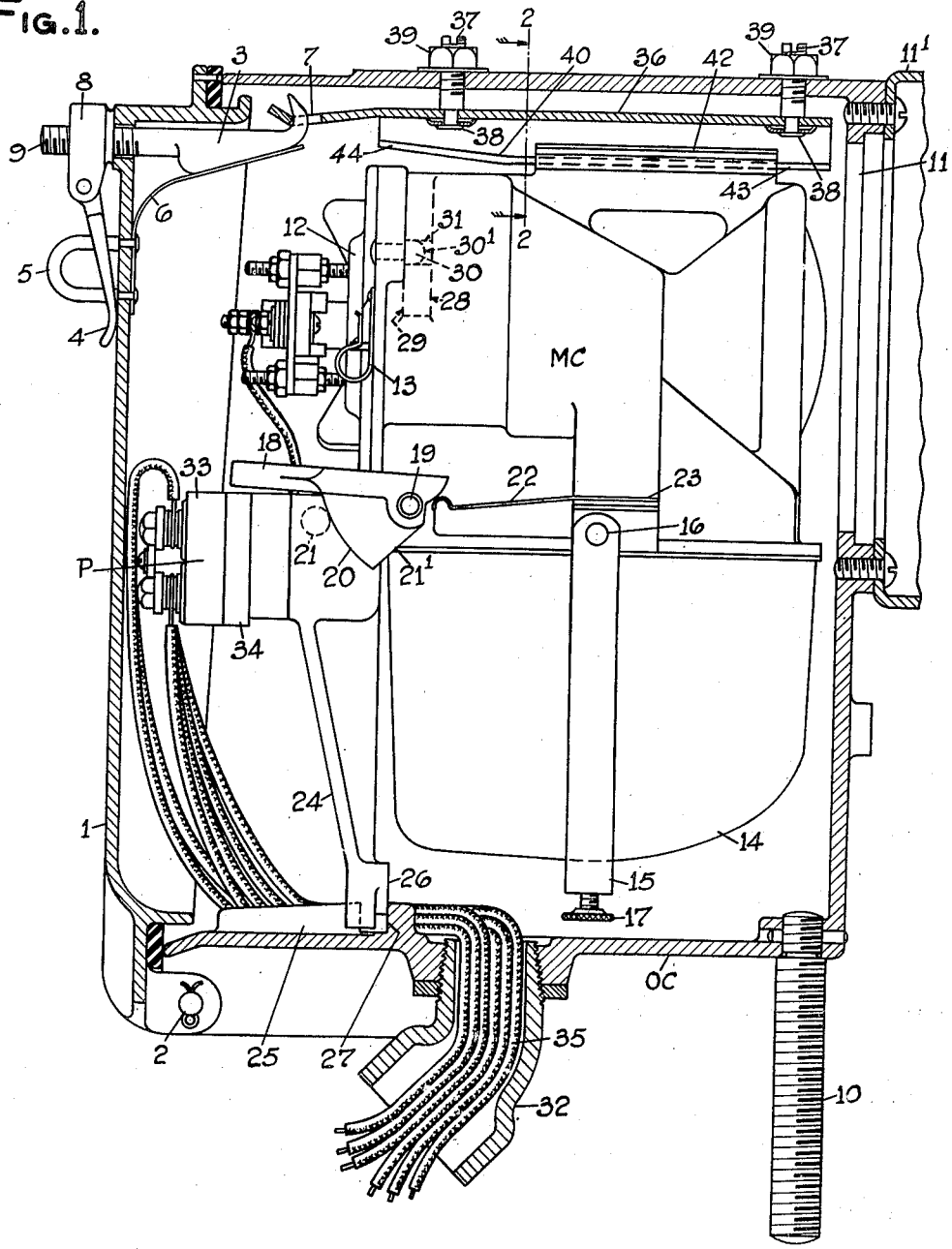
Fig. 1 is a sectional view, with parts shown in elevation, and parts omitted, on line 1—1 of Fig. 2, viewed in the direction of the arrows.
Figure 2:
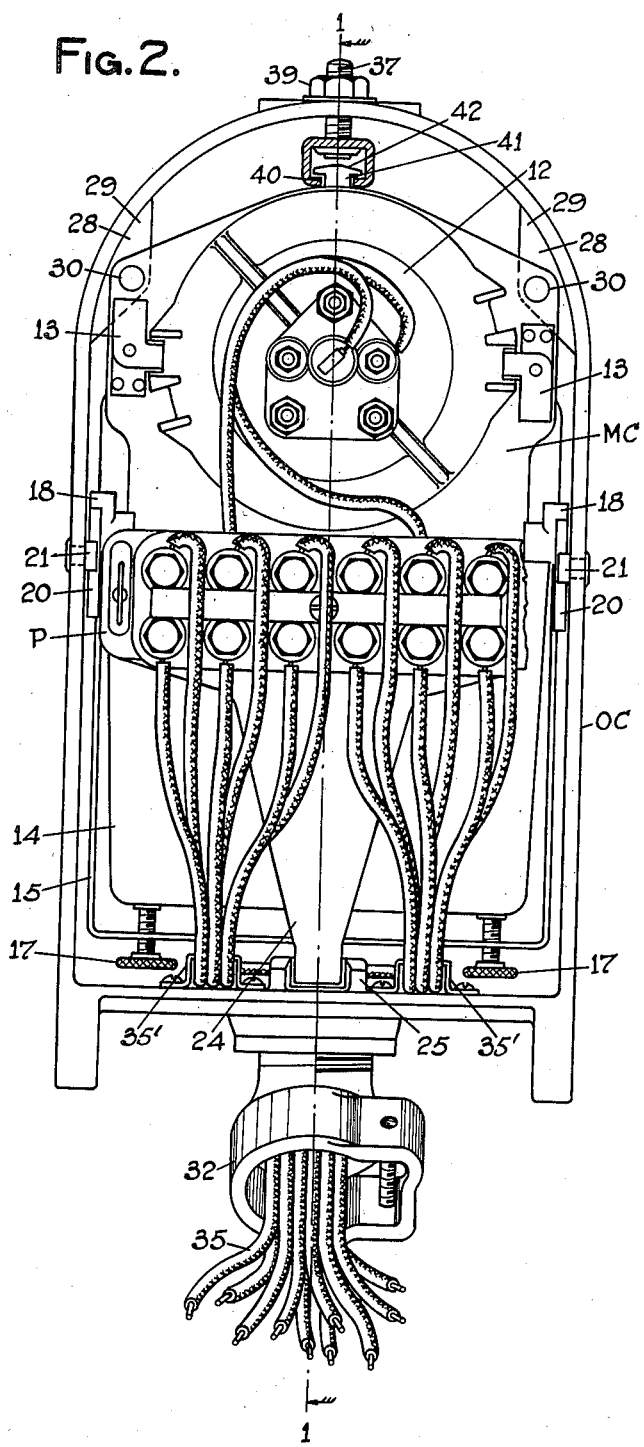
Fig. 2 is a rear elevation, with parts removed, and a portion in section taken on line 2—2 of Fig. 1, viewed in the direction of the arrows.
Figure 3:
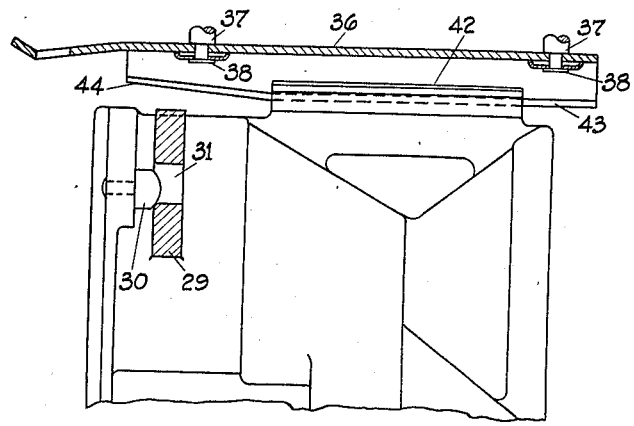
Figs. 3 and 4 are fragmentary sectional views, with parts shown in elevation, of a detail of the construction.
Figure 4:
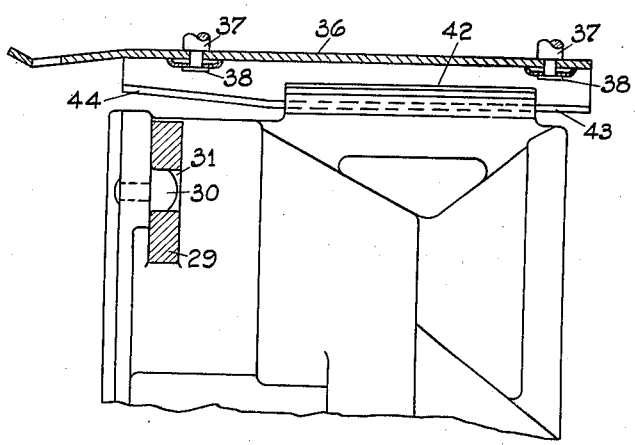

The signal comprises an outer casing OC, and an inner mechanism casing MC, the outer casing being fitted with a door 1, hinged at 2, and furnished with a latch 3, on which is a member 4, with means, at 5, for locking the door in its closed position by means of a padlock or the like. The latch 3 is biased by a leaf spring 6, to hold it in a receiving opening 7, in the end of a slide member, to be described in detail below. To open the door, a nut 8, on member 4, is turned back on a threaded stem 9 extending from 3, to permit pushing the latch inwardly and downwardly against the spring 6, whereby to release the door.

The outer casing OC, is furnished with a threaded stem 10 and other means (not shown), for mounting the casing on a signal pole, or the like, but since this constitutes no part of the present invention, there is no occasion to show or describe it further.

At the front end of the outer casing is an opening 11 for receiving a lens holder 11$^1$ through which opening and lens the light passes to constitute the signal aspect.

The mechanism casing MC, carries a light source and a reflector unit 12, which can readily be inserted into the mechanism casing and removed therefrom by holding means 13.

A motor mechanism is received within a lower part 14, of the mechanism casing, this part 14 being removably held in place by a strap 15, pivoted at 16 to the mechanism casing proper, and carrying thumb screws 17 for clamping the part 14 securely in position.

At each side, and to the rear, of the mechanism casing, is a latch 18, pivoted at 19 to the casing, and having a curved cam face 20, which coacts with a lug 21 carried by, and projecting into, the outer casing, the latch being biased in a counterclockwise direction, by means of a leaf spring 22, carried by the mechanism casing in a slot 23.

Constituting part of the mechanism casing is a downwardly extending arm 24, receivable in a guide 25 in the outer casing, and positioned with its inner face 26, against a flat face 27 at the inner end of the guide 25, when the casing MC is in place.

Carried by the outer casing, are two inwardly projecting shoulders 28, having flat faces 29, which are accurately positioned to be in the same plane as the face 27, to thereby define a plane at right angles to the optical axis of the signal, and to accurately position the mechanism casing within the outer casing, as appears below.

Carried by the mechanism casing are two dowel pins 30, each snugly receivable in a fitting opening 31, in each of the shoulders 28, whereby to accurately position the mechanism casing within the outer casing in proper position to assure that the light emitted from the mechanism casing will bear the proper relationship to the lens carried by the outer casing, the cam faces 20 and spring 22 pressing the three contacting faces together.

The various wires 35 leading into the signal, pass through an inlet connection 32, and up to one member 33, of a plug coupler, the other member 34, of the coupler, being suitably fastened to the mechanism casing. While the number of wires leading into the signal may vary, there is always a considerable number, (in the present case twelve) and these wires furnish energy to the light source, the motor mechanism, and various contacts controlled by the motor mechanism. Thus the necessity for making wire connections and tagging them is avoided. These wires 35 are held down flat on the bottom of the outer casing, by clamps 35', whereby to provide sufficient clearance for the insertion of the mechanism casing into the outer casing without striking the wires, and hence, without, in the course of time, possibly rubbing the wires and damaging the insulation.

The mechanism casing together with its various parts contained therein, constitutes a rather heavy unit, and accordingly, the insertion of this mechanism casing into the outer casing, is a difficult task unless some means is provided to facilitate the operation. With this in view, a receiving slide member 36, is provided. This slide member is carried by two screws 37, which are riveted or otherwise suitably fastened, at 38, to the slide, and are held in place on the outer casing as by nuts 39, whereby to be adjustable in position to thereby adjust the position of the slide 36 so as to compensate for variations which, for example, may occur during manufacture. In cross section the slide is rectangular, and at the bottom has a slot 40, extending the length of the slide, to receive the shank 41, of a T-shaped elongated head 42, carried on the top of the mechanism casing.

The lower part of the slide 36 has an inner horizontal portion 43, and an outer upwardly sloping portion 44, whereby to properly tilt the mechanism casing, while it is being inserted into the outer casing, to provide proper clearance between various parts, as described below.

In the installation and maintenance of signals of the type here involved, it is contemplated, in the event any of the mechanism gets out of order, that the entire mechanism casing will be removed and replaced in the field by a duplicate mechanism casing, and with a view to facilitating this important operation, the above described receiving slide 36, and the plug coupler P have been provided.

With the above described arrangement of parts, in the event it be desired to remove the mechanism casing, the door 1 is opened, the outer member 33 of the plug coupler is pulled away from the inner member 34, and dropped down out of the way, whereupon the latches 18 are rocked upwardly, in a clockwise direction, and the entire mechanism casing can be readily withdrawn from the outer casing while it is being supported by the slide 36, it being understood that, as soon as pins 30, leave their sockets 31, the entire casing drops slightly, to be supported by the slide.

Upon inserting a mechanism casing into the outer casing, it is merely necessary to insert the head 42 on the mechanism casing, into the slide 36, and push the mechanism casing inwardly into place. During the first part of the operation, the mechanism casing is tilted upwardly at the rear end, due to the upwardly inclined slide portion 44, and this raises the mechanism casing high enough to allow the pins 21, carried by the outer casing, to strike the inclined face $21^1$ of the latches, and cam them upwardly as the casing is pushed inwardly. As the mechanism casing is pushed along the slide, with the member 24 following in its guide 25, the center points of the two pins 30 strike their openings 31, at a point slightly below the centers of the openings, whereby the curved faces $30^1$ at the ends of the pins, cam the entire mechanism casing slightly upwardly, to assume the position as shown in Fig. 1, where the pins 30 are snugly received in the openings 31, and the mechanism casing has been raised slightly, whereby to raise the head 42 clear of the bottom of the slide 36, whereby to relieve the slide from supporting any of the weight of the mechanism casing, and to support the mechanism casing wholly from the two pins 30.

After the lower portions of the faces $21^1$ of the latches 18 have passed beyond the pins 21, the springs 22 force their latches in a counterclockwise direction, to ride each cam face 20 along the pin 21, and force the mechanism casing inwardly and against the three surfaces 29, 29 and 27, to thus accurately position the mechanism casing in the same relative position with respect to the outer casing, as was the replaced mechanism casing. It is then merely necessary to connect up the plug coupler, by plugging the part 33 into the receiving part 34.

If there were no plug coupler employed, on replacing a mechanism unit, it would be necessary to disconnect each wire from its binding post, and then tag the wires in order to avoid any mistake in later properly connecting up these wires with the new mechanism casing, all of which would consume considerable time and open the possibility for mistakes. This is all obviated, however, by the use of the plug coupler in connection with the signal herein described.

Also, were it not for the slide 36, which facilitates the replacement of a mechanism casing, it would be necessary to support the entire weight of the mechanism casing as it was being inserted into the outer casing, and in addition to tilt it upwardly in order to permit latches 18 and pivots 19 to clear the cooperating pins 21, and to support the mechanism casing as it is inserted further into the outer casing until the pins 30 are inserted into their receiving openings 31. Of course, on removing a casing, the reverse is true. With the use of the slide 36, however, the operation is greatly simplified, and the mechanism casing is automatically tilted upwardly at the rear as it is first inserted into the outer casing in order to cause the latches to clear the pins 21; the slide, as shown in Fig. 1, permitting the mechanism casing to drop downwardly after the latches 18 have passed beyond the pins 21, to thereby firmly maintain the mechanism casing within the outer casing.

With the arrangement as above described, where the pins 30 operate to raise the mechanism casing out of contact with the slide 36, it is seen there is no necessity for positioning the slide accurately parallel to the optical axis of the signal. If the weight of the mechanism casing were partly, or wholly, supported by the slide, the slide might force the mechanism casing out of proper position if the slide were out of parallelism with the optical axis of the signal. Since it is very essential that a replacement mechanism casing shall assume exactly the same relative position with respect to the outer casing, as did the replaced mechanism casing, it is clear that it is important that the slide be relieved of supporting any of the weight of the mechanism casing.

Thus, with parts as above described, the maintenance and repair of signals of this type have been greatly facilitated, since no wire connections need be made and broken, and no wires need be tagged; and much effort and trouble has been avoided by providing a slide to sustain the weight of the mechanism casing while it is being inserted into the outer casing and at the same time to properly position the mechanism casing so as to provide the necessary clearances as it is being inserted into the outer casing, and of course, the same is true, on removing a casing.

The above rather detailed description of one form of the present invention, has been given solely by way of example, and is not intended, in any manner whatsoever, in a limiting sense. It is intended that all such changes, modifications, and adaptations, shall be covered by the present application, as come within the scope and spirit of the invention, and within the language of the appended claims.

Having described my invention, I now claim:

1. In a light signal for railroads, and the like, in combination, an outer casing having an open rear end, a door for closing the rear end, a slotted slide carried inside, and by the top of, the casing, means for adjusting the slide in position relatively to the top of the casing, said slide running lengthwise of the casing, an inner casing insertable into the outer casing through the rear thereof, interengageable guide means on the inner and outer casings, an elongated head on the top of the inner casing of a section to be receivable in the slide and cause the slide to support the entire weight of the inner casing as the head slides along the slide and the casing is slid into the outer casing.

2. In a light signal for railroads, in combination, an outer casing having an open rear end, light directing means in the front end of the casing, an inner casing containing light controlling means and receivable within the outer casing through the open rear end, matching members on the two casings for positioning the inner casing in an invariable position within the outer casing when the matching members are in final contact, a slotted supporting slide carried inside, and by the top of, the outer casing, and extending lengthwise of the casing, a carrying head on the top of the inner casing receivable in the slide for supporting the weight of the inner casing as it is pushed into, and toward the front of, the outer casing, and cam faces on certain of the matching members operative to raise the carrying head clear of the slide just before the inner casing reaches its final position.

3. In a light signal for railroads, in combination, an outer casing having an open rear end, light directing means in the front end of the casing, an inner casing containing light controlling means and receivable within the outer casing through the open rear end, a supporting slotted slide carried inside, and by the top of, the outer casing, and extending lengthwise of the casing, a carrying head on the top of the inner casing receivable in the slide for supporting the weight of the inner casing as it is pushed into, and toward the front of, the outer casing, pins on the outer casing, latches on the inner casing cooperating with the pins to hold the inner casing in place within the outer casing, the slide having its rear portion inclined upwardly to thereby tilt the rear end of the inner casing and its latches upwardly, to clear the pins during the first part of the insertion, the front part of the slide being lower than the rear end, to thereby lower the inner casing and drop part of the latches in front of, and below, the cooperating pins.

4. In a light signal for railroads, and the like, in combination, an outer casing having an open rear end, a door for closing the rear end, a slotted slide, of general hollow rectangular form in cross section and with the slot in the lower face, carried inside, and by the top of, the casing, and running lengthwise of the casing, means for adjusting the position of the slide, an inner casing insertable into the outer casing from the rear, an elongated T-shaped head on the top of the inner casing of a section to be received in the slide, with the stem of the T passing through the slot in the slide, so as to cause the slide to support the entire weight of the inner casing from the head of the T as it is slid into the outer casing, perforated shoulders on the inside of the outer casing, dowel pins on the inner casing each receivable snugly in a shoulder perforation, a rounded cam face on the end of each pin, the slide being adjusted in position to cause the center line of each pin to strike its shoulder in line with the perforation, but slightly below the center of the perforation, whereby, as the pin enters its perforation, the inner casing is cammed up to lift it clear of the slide; and latch means to hold the casings firmly in position.

5. In a light signal for railroads, and the like, in combination, an outer casing having an open rear end, a door for closing the rear end, a slotted slide carried inside, and by the top of, the casing, and running lengthwise of the casing, an inner casing insertable into the outer casing from the rear, an elongated T-shaped head on the top of the inner casing receivable in the slide and slidable along the slot so as to cause the slide to support the entire weight of the inner casing as it is slid into the outer casing, and a spring pressed hasp on the door engageable with an opening in the rear end of the slide to thus hold the door in closed position.

6. In a light signal for railroads, in combination, an outer casing having an open rear end, light directing means in the front end of the casing, an inner casing containing light controlling means and receivable within the outer casing through the open rear end, a plurality of electric wires passing into the outer casing from the outside, an elongated two-part plug having a length substantially equal to the width of the outer casing, and connecting the wires to the light controlling means in the inner casing, a slotted supporting slide carried inside, and by the top of, the outer casing and extending lengthwise of the casing, a carrying head on the top of the inner casing receivable in the slide for supporting the weight of the inner casing as it is pushed into, and toward the front of, the outer casing and means clamping the said wires to the bottom of the outer casing to provide clearance, when the wires are disconnected from the light controlling means and dropped downwardly from the outer casing, for the inner casing as it is moved on its slide.

EDMUND W. MOORE.